United States Patent
Whittle et al.

(10) Patent No.: US 11,149,581 B2
(45) Date of Patent: Oct. 19, 2021

(54) TURBINE ENGINE COMPONENT WITH OVERSTRESS INDICATOR

(71) Applicants: Rolls-Royce plc, London (GB); Rolls-Royce High Temperature Composites Inc., Cypress, CA (US)

(72) Inventors: Michael J. Whittle, London (GB); Anthony G. Razzell, London (GB); Stephen I. Harris, Long Beach, CA (US)

(73) Assignees: Rolls-Royce plc; Rolls-Royce High Temperature Composites Inc., Cypress, CA (US)

( * ) Notice: Subject to any disclaimer, the term of this patent is extended or adjusted under 35 U.S.C. 154(b) by 70 days.

(21) Appl. No.: 16/692,617

(22) Filed: Nov. 22, 2019

(65) Prior Publication Data

US 2021/0156275 A1     May 27, 2021

(51) Int. Cl.
     *F01D 21/00*      (2006.01)
     *F02C 7/00*      (2006.01)

(52) U.S. Cl.
     CPC ............... *F01D 21/00* (2013.01); *F02C 7/00* (2013.01)

(58) Field of Classification Search
     CPC .......... F01D 5/284; F01D 5/286; F01D 5/288; F01D 5/3084; F01D 21/00; F01D 21/003; F02C 7/00; G01M 5/0016; G01M 5/0033; Y02T 50/60; Y02T 50/672; F05D 2260/80

See application file for complete search history.

(56) References Cited

U.S. PATENT DOCUMENTS

| | | | |
|---|---|---|---|
| 3,577,373 A * | 5/1971 | Kremer | D21H 19/18 524/277 |
| 3,803,482 A | 4/1974 | Crites et al. | |
| 4,917,938 A | 4/1990 | Mohan | |
| 5,209,645 A * | 5/1993 | Kojima | C23C 4/02 416/224 |
| 5,534,289 A | 7/1996 | Bilder et al. | |
| 5,700,743 A * | 12/1997 | Puchinger | B32B 18/00 442/243 |
| 5,806,796 A * | 9/1998 | Healey | B29C 70/088 244/117 R |
| 6,663,983 B1 * | 12/2003 | Darolia | C23C 14/083 416/241 B |
| 6,943,869 B2 | 9/2005 | Hubner et al. | |
| 7,156,622 B2 * | 1/2007 | Schreiber | F01D 5/147 416/224 |
| 7,565,778 B2 * | 7/2009 | Azeau | B32B 25/04 52/741.3 |
| 8,059,008 B2 | 11/2011 | Marincak | |
| 8,079,806 B2 * | 12/2011 | Tholen | F01D 11/125 415/171.1 |

(Continued)

FOREIGN PATENT DOCUMENTS

CN      100580434 C      1/2010

*Primary Examiner* — Patrick Assouad
*Assistant Examiner* — Sean Curtis
(74) *Attorney, Agent, or Firm* — Barnes & Thornburg LLP

(57) ABSTRACT

A component for use in a gas turbine engine includes a component body, and a damage-indicative coating. The damage-indicative coating is configured to change from an intact state in which the damage-indicative coating has a first appearance to a damaged state in which the damage-indicative coating has a second appearance.

17 Claims, 4 Drawing Sheets

(56) References Cited

U.S. PATENT DOCUMENTS

| | | | |
|---|---|---|---|
| 8,739,611 B2* | 6/2014 | Care | G01M 5/0016 |
| | | | 73/112.01 |
| 9,334,039 B2 | 5/2016 | Kaye et al. | |
| 9,458,763 B2* | 10/2016 | Roth-Fagaraseanu | |
| | | | F23R 3/002 |
| 9,908,173 B2* | 3/2018 | Schreiber | B22C 9/22 |
| 10,047,442 B2* | 8/2018 | Wang | C22C 32/0068 |
| 10,711,621 B1* | 7/2020 | Whittle | F01D 5/189 |
| 10,767,495 B2* | 9/2020 | Whittle | F01D 25/162 |
| 2002/0000128 A1* | 1/2002 | Williams | G01N 21/91 |
| | | | 73/762 |
| 2002/0197465 A1* | 12/2002 | Butner | C04B 35/18 |
| | | | 428/293.4 |
| 2005/0248191 A1* | 11/2005 | Azeau | B32B 15/06 |
| | | | 297/216.1 |
| 2009/0136345 A1* | 5/2009 | Tholen | F01D 11/125 |
| | | | 415/230 |
| 2016/0003068 A1 | 1/2016 | Greenberg et al. | |
| 2016/0122877 A1* | 5/2016 | Wang | C23C 28/345 |
| | | | 427/180 |
| 2017/0002667 A1* | 1/2017 | Steinwandel | C04B 35/62894 |
| 2019/0093499 A1* | 3/2019 | Sippel | F01D 25/005 |
| 2020/0248567 A1* | 8/2020 | Whittle | F01D 9/042 |
| 2020/0248568 A1* | 8/2020 | Whittle | F01D 5/282 |
| 2020/0248569 A1* | 8/2020 | Whittle | F01D 25/162 |
| 2020/0277871 A1* | 9/2020 | Shi | F01D 5/20 |

* cited by examiner

TURBINE ENGINE COMPONENT WITH OVERSTRESS INDICATOR

FIELD OF THE DISCLOSURE

The present disclosure relates generally to components used in gas turbine engines, and more specifically to components with damage-indication features helpful to the assembly of the components in the gas turbine engine.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines are typically inspected after being assembled to ensure that components in the gas turbine engine were properly installed and are in working order. In some instances, it may be difficult to examine each component in the gas turbine engine with sufficient detail because they may be in locations that are difficult to view. Additionally, faults in the components, caused as a result of improper installation, may be relatively small and difficult to detect after installation or to see with the human eye. If left untreated, components with faults may deteriorate faster than other components in the gas turbine engine.

SUMMARY

The present disclosure may comprise one or more of the following features and combinations thereof.

According to a first aspect of the present disclosure, a method of detecting damage to a ceramic matrix composite component prior to use in a gas turbine engine includes providing a component body comprising ceramic matrix composite materials. The method may further include selecting a damage-indicative coating material configured to change from an intact state to a damaged state. In the intact state, the damage-indicative coating material may have a first appearance. In the damaged state the damage-indicative coating material may have a second appearance in response to the component body experiencing a strain level greater than a predetermined strain level of the component body.

In some embodiments, the method may further include applying the damage-indicative coating material to establish an outermost coating layer on the component body to provide a damage-indicative coating once the coating material is solidified. The method may further include installing the component with the applied damage-indicative coating in the gas turbine engine.

In some embodiments, the method may further include inspecting the damage-indicative coating in the gas turbine engine to determine if the damage-indicative coating has the first appearance or the second appearance. The method may further include replacing the component with a new component upon determining that the damage-indicative coating has the second appearance.

In some embodiments, the method may further include a step of starting the gas turbine engine to remove the damage-indicative coating in a burn-off cycle upon determining that the damage-indicative coating has the first appearance after the step of inspecting the component. In some embodiments, the damage-indicative coating includes a wax.

In some embodiments, the method may further include a step of purging the gas turbine engine with a solvent to remove the damage-indicative coating after the step of inspecting the component. In some embodiments, the damage-indicative coating comprises a lacquer.

In some embodiments, the predetermined strain level is less than or equal to a proportional limit strength of the component body. In some embodiments, the predetermined strain level is less than the proportional limit strength of the component body. In some embodiments, the predetermined strain level is about 0.05 percent.

In some embodiments, the step of selecting the damage-indicative coating material includes selecting a damage-indicative coating material that has a fracture strength that is about equal to the proportional limit strength of the component body.

In some embodiments, the step of applying the damage-indicative coating material includes selectively applying the coating material only to areas that are visible during the step of inspecting the component. In some embodiments, the damage-indicative coating material is selectively applied to gas path facing surfaces. In some embodiments, the step of selectively applying the damage-indicative coating material includes masking off areas of the component that interact with other components after the component is installed. In some embodiments, the step of selectively applying the damage-indicative coating material includes masking off cooling holes formed in the component body.

In some embodiments, the second appearance is provided by at least one of cracks in the damage-indicative coating and portions of the damage-indicative coating flaking off of the component.

In some embodiments, the damage-indicative coating comprises a luminescent additive and the step of inspecting the component includes scanning the component with ultraviolet light.

According to a second aspect of the present disclosure, a component for use in a gas turbine engine includes a component body and a damage-indicative coating. The component body may be configured to be mounted in the gas turbine engine. The damage-indicative coating may establish an outermost surface of the component that is visible during inspection of the component. The damage-indicative coating may have a fracture strength that is about equal to a predetermined strain level of the component body.

In some embodiments, the damage-indicative coating is configured to change from an intact state in which the damage-indicative coating has a first visual appearance to a damaged state in which the damage-indicative coating has a second visual appearance in response to the component experiencing a strain level greater than the predetermined strain level of the body.

In some embodiments, the component body comprises ceramic matrix composite materials. In some embodiments, the damage-indicative coating comprises a wax and is configured to be removed from the component body during initial start-up of the gas turbine engine. In some embodiments, the damage-indicative coating comprises a lacquer and is configured to be removed from the component body by purging the gas turbine engine with a solvent.

In some embodiments, the damage-indicative coating comprises a luminescent additive that is visible under ultraviolet light after the component body experiences a strain greater than the predetermined strain level.

These and other features of the present disclosure will become more apparent from the following description of the illustrative embodiments.

DETAILED DESCRIPTION OF THE DRAWINGS

Figure 1:
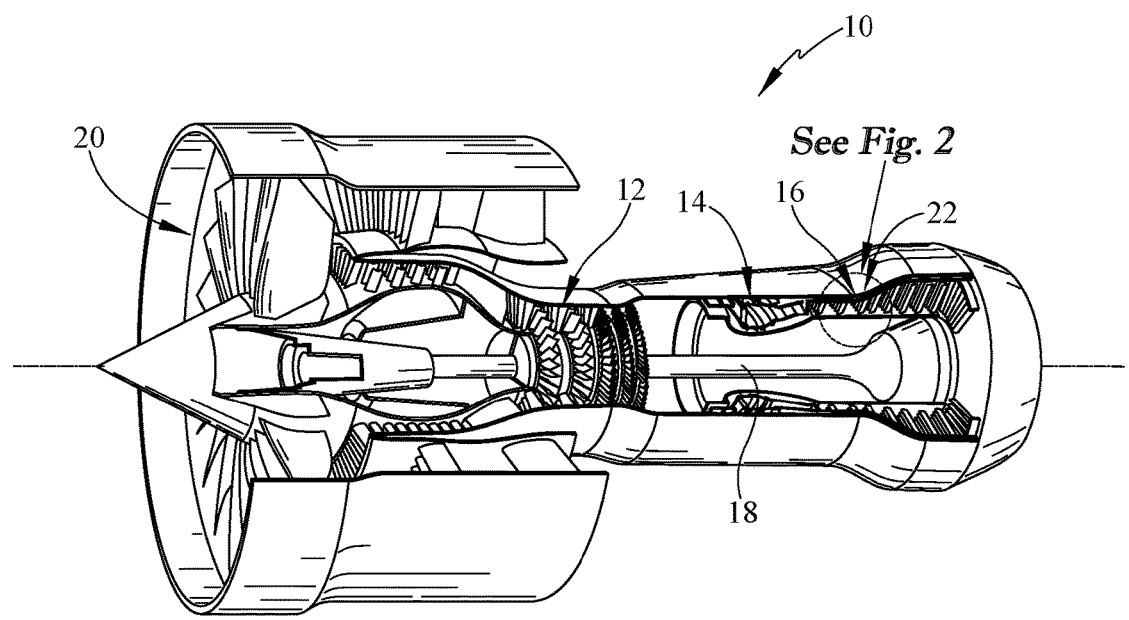
FIG. 1 is perspective view of an illustrative gas turbine engine with a section cutaway to show that the gas turbine engine includes a compressor section, a combustor section, and a turbine section.

For the purposes of promoting an understanding of the principles of the disclosure, reference will now be made to a number of illustrative embodiments illustrated in the drawings and specific language will be used to describe the same.

An illustrative gas turbine engine 10 is shown in FIG. 1 and includes a compressor section 12, a combustor section 14, and a turbine section 16. The compressor section 12 compresses and delivers air to the combustor section 14. The combustor section 14 mixes fuel with the compressed air received from the compressor section 12 and ignites the fuel to produce hot, high pressure products as a result of the combustion reaction. The hot, high pressure products of the combustion reaction in the combustor section 14 are directed into the turbine section 16 where they interact with the turbine section 16 and drive rotation of an output shaft 18. The output shaft 18 is coupled to a fan 20 in the illustrative embodiment and drives rotation of the fan 20 to produce thrust for the gas turbine engine 10. In other embodiments, the output shaft 18 may be coupled to a generator or another device that is driven in rotation by the output shaft 18 to produce a usable byproduct or effect using the rotation of the output shaft.

Figure 3:
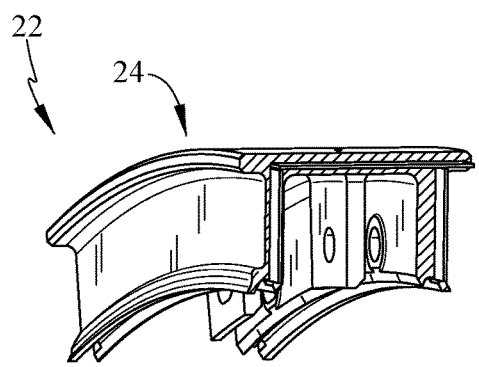
FIG. 3 is a perspective view of the component of FIG. 2 after being assembled showing that the damage-indicative coating has changed to a damage state in response to the component being exposed to a strain sufficient to cause damage to the component and decrease a useful life of the component.
Figure 3:
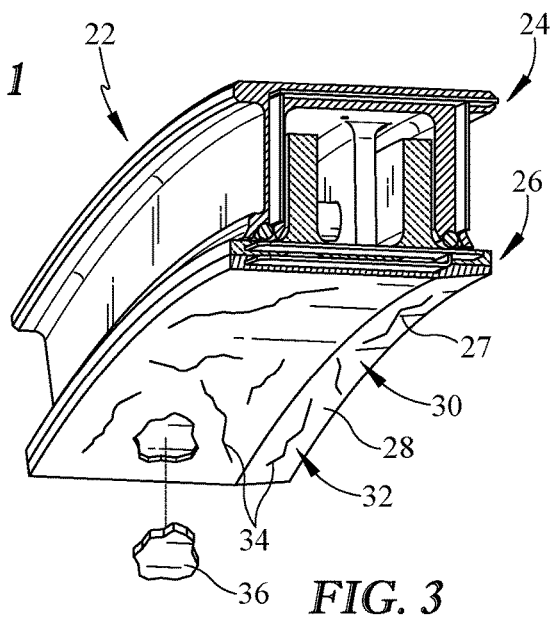
Figure 2:
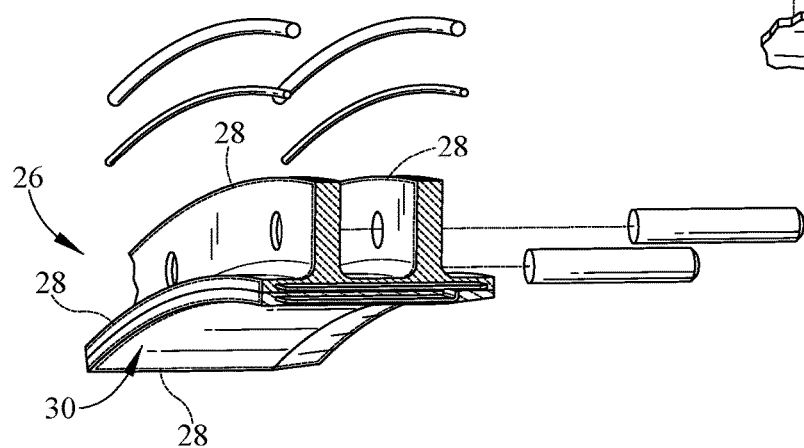
FIG. 2 is an exploded assembly view of an illustrative component configured to be mounted in the gas turbine engine of FIG. 1 during assembly of the gas turbine engine and showing that the component includes a damage-indicative coating that establishes an outermost surface of the component to visually indicate when damage to the component has occurred.

The gas turbine engine 10 is assembled from a plurality of components as shown in FIG. 1. One illustrative component 22 that may be installed in the gas turbine engine 10 is shown in FIGS. 2 and 3. The component 22 is illustratively embodied as a turbine shroud assembly that is mounted in the turbine section 16 of the gas turbine engine 10. The turbine shroud assembly includes a carrier 24 and a blade track 26 that is configured to be mounted to the carrier 24 as suggested in FIG. 2. The blade track 26 provides an outer boundary of a gas path in the gas turbine engine 10 and interfaces with a plurality of rotating blades (not shown).

Premature failure of the blade track 26 may occur if the blade track 26 is handled or installed improperly. For example, mishandling the blade track 26 or improperly installing the blade track 26 may impart a stress that exposes the blade track 26 to a strain level sufficient to cause damage to the blade track 26. If the blade track 26 is damaged in this way, the useful life of the blade track 26 may be reduced. Moreover, the damage caused to the blade track 26 may not be visible to a naked, human eye.

In the illustrative embodiment, a damage-indicative coating 28 is applied on the blade track 26 as suggested in FIG. 2. The damage-indicative coating 28 establishes an outermost surface 30 of the blade track 26 that is visible to a person inspecting the gas turbine engine 10. The damage-indicative coating 28 is configured to change from an intact state, as shown in FIG. 2, to a damaged state, as shown in FIG. 3, if the blade track 26 is exposed to a strain level that is sufficient to damage the blade track 26. The damaged state of the blade track 26 signals to a person inspecting the gas turbine engine 10 that the blade track 26 has been damaged. Replacing the blade track 26 may avoid premature failure of the blade track 26 due to the damage and resulting efficiency losses to the gas turbine engine 10.

In the illustrative embodiment, the damage-indicative coating 28 has a first visual appearance 30 in the intact state and a second visual appearance 32 in the damaged state. The first visual appearance 30 is characterized by the damage-indicative coating 28 being undamaged and intact. The damage-indicative coating 28 may not be readily visible to humans when in the intact state such that a person inspecting the blade track 26 perceives only the blade track 26 and not the damage-indicative coating 28 as suggested in FIG. 2. In other embodiments, the damage indicative coating 28 may be visible in the intact state. A person inspecting the blade track 26 may be trained such that a change from the first visual appearance to the second visual appearance triggers a response from the person to address the damaged blade track 26.

The second visual appearance 32 is characterized by the damage-indicative coating 28 having a noticeably damaged appearance to indicate to a person inspecting the blade track 26 that the blade track 26 is damaged and should be addressed. The second visual appearance is provided by at least one of cracks 34 in the damage-indicative coating and flakes 36 of the damage-indicative coating removed from the blade track 26.

In some embodiments, the second visual appearance of the damage-indicative coating 28 mimics and exaggerates an appearance of a damaged blade track 26 so that damage to the blade track 26 can be more easily identified compared to a blade track without the damage-indicative coating 28. For example, cracks 34 in the blade track 26 alone may be invisible to the human eye but may nonetheless affect gas turbine engine performance or the useful life of the blade track 26 if left unaddressed. The damage-indicative coating 28 produces a more noticeable damage pattern in line with damage to the underlying structure to highlight damage to the underlying structure that otherwise may not have been seen.

Figure 4:
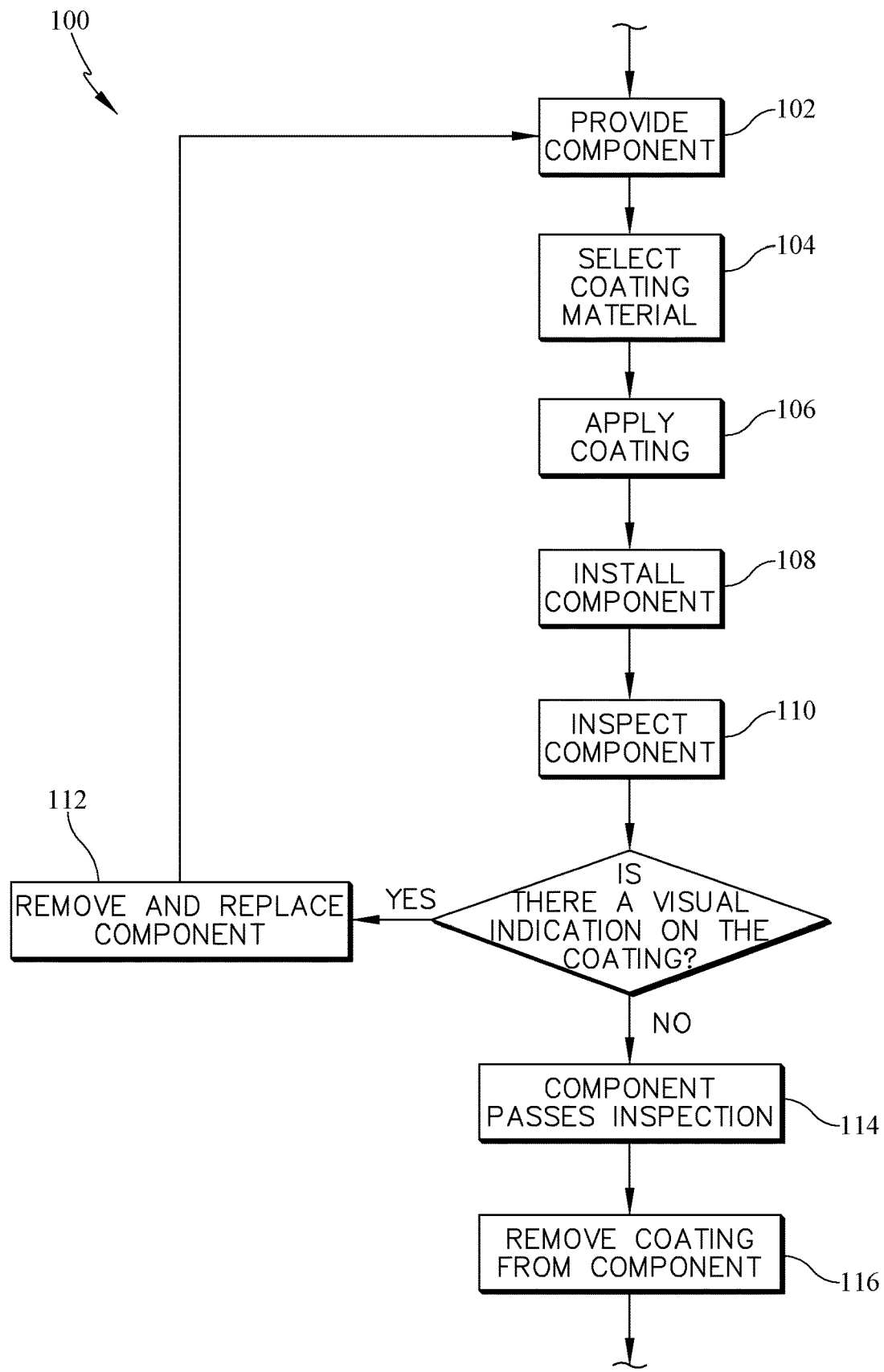
FIG. 4 is a flowchart of an assembly process of a component in the gas turbine engine of FIG. 1 using the damage-indicative coating to visually detect damage to the component during assembly.
Figure 7:
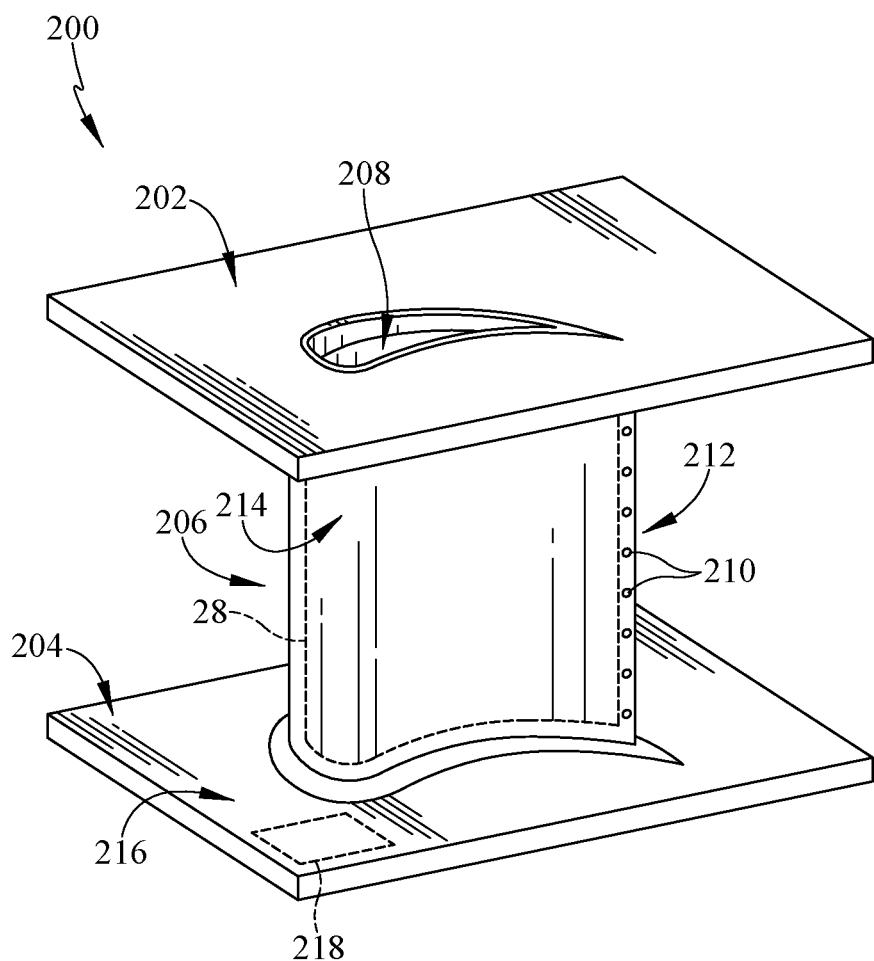
FIG. 7 is a perspective view of another illustrative component configured to be mounted in the gas turbine engine of FIG. 1 showing that application of the damage-indicative coating can be controlled such that the damage-indicative coating is applied to selective areas and omitted from selective areas.
Figure 8:
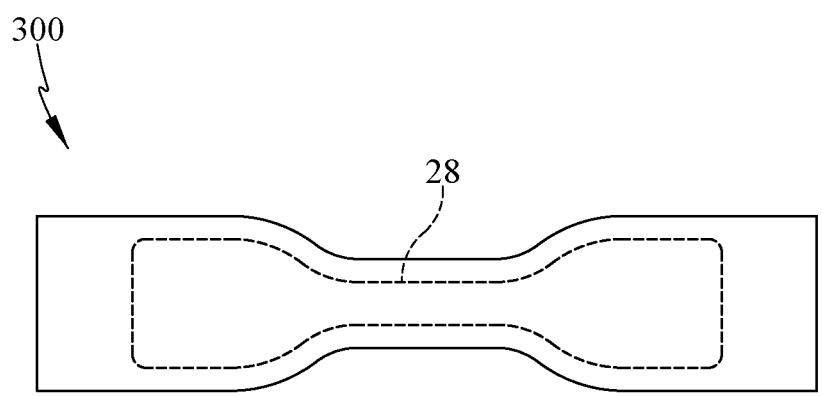
FIG. 8 is a perspective view of a strain-test coupon with a damage indicative coating applied over a test area of the strain-test coupon to visually indicate when damage to the strain-test coupon has occurred and minimize false test data.

Although the illustrative embodiment shows and describes a blade track 26 in FIGS. 1-3, the damage indicative coating 28 may be applied to any component or structure in the gas turbine engine 10. For example, the damage-indicative coating 28 may be applied on an airfoil structure such as a vane 200 as shown in FIG. 7 or a strain-test coupon 300 as shown in FIG. 8. For each of these components, and others, the damage indicative coating 28 is used in a method or process 100 of visually detecting damage to the component or material prior to use in the gas turbine engine 10 as shown in FIG. 4. The method may begin with a step 102 of providing a component body. The component body, such as blade track 26, vane 200, and strain-test coupon 300, may comprise a composite material such as a ceramic matrix composite material. In other embodiments, the component body may comprise a metallic material or another suitable material used in the gas turbine engine 10.

The method continues with a step 104 of selecting a damage-indicative coating material. The damage-indicative coating material may include a wax, lacquer, or another suitable organic-based coating material. In some embodiments, the damage-indicative coating material may include a high-temperature capable material such as silicon-carbide, yttrium oxide, or another suitable high-temperature coating material. In yet another embodiment, the damage-indicative coating material comprises a luminescent additive that is visible under ultraviolet (UV) light.

The step 104 of selecting a damage-indicative coating material may include selecting the damage-indicative coating material based at least in part on a proportional limit strength of the component body. For example, in the illustrative embodiment, the damage indicative coating material is selected based on its ability to change from the first visual appearance to the second visual appearance at a predetermined strain level at which damage to the component body occurs. The step of selecting the damage-indicative coating material may further include selecting a damage-indicative coating material that has a fracture strength that is about equal to the proportional limit strength of the component body. In some embodiments, the proportional limit strength is equal to a yield strength of the component body.

In some embodiments, the predetermined strain level is close to but less than a strain level at which damage to the component body occurs. In some embodiments, the predetermined strain level is less than or equal to the proportional limit strength of the component body. In some embodiments, the predetermined strain level is about 0.05 percent, or just less than the proportional limit strength of the component body which may occur at an absolute strain value of approximately 0.06-0.07 percent. In some embodiments, the predetermined strain level is about 0.04 percent. In some embodiments, the predetermined strain level is about 0.03 percent. In some embodiments, the predetermined strain level is about 0.02 percent. In some embodiments, the predetermined strain level is about 0.01 percent. The method continues with a step 106 of applying the selected damage-indicative coating material to establish a visible outermost coating layer on the component body. The visible, outermost coating layer provides the damage-indicative coating 28 once the coating material is solidified over the component body. The damage-indicative coating material may be applied directly to an outer surface of the component body, or to an intermediate layer such as an environmental barrier coating (EBC) or a thermal barrier coating (TBC).

The method continues with a step 108 of installing the component with the applied damage-indicative coating 28 in the gas turbine engine 10. The step 108 of installing the component may include intermediate steps following the step of applying the damage-indicative coating material until the component is assembled as a part of the gas turbine engine. The intermediate steps may include handling and transporting the component to the gas turbine engine for assembly.

As described above, the damage-indicative coating 28 is configured to change from an intact state to a damaged state in response to the component body experiencing a strain level greater than the predetermined strain level of the component body. The method continues with a step 110 of inspecting the component to determine if the damage-indicative coating 28 has the first visual appearance or the second visual appearance. A person inspecting the component may inspect the component first-hand or may use a device or tool such as a camera, a borescope, a probe, or another device to aid the person with the step 110 of inspecting the component.

Figure 5:
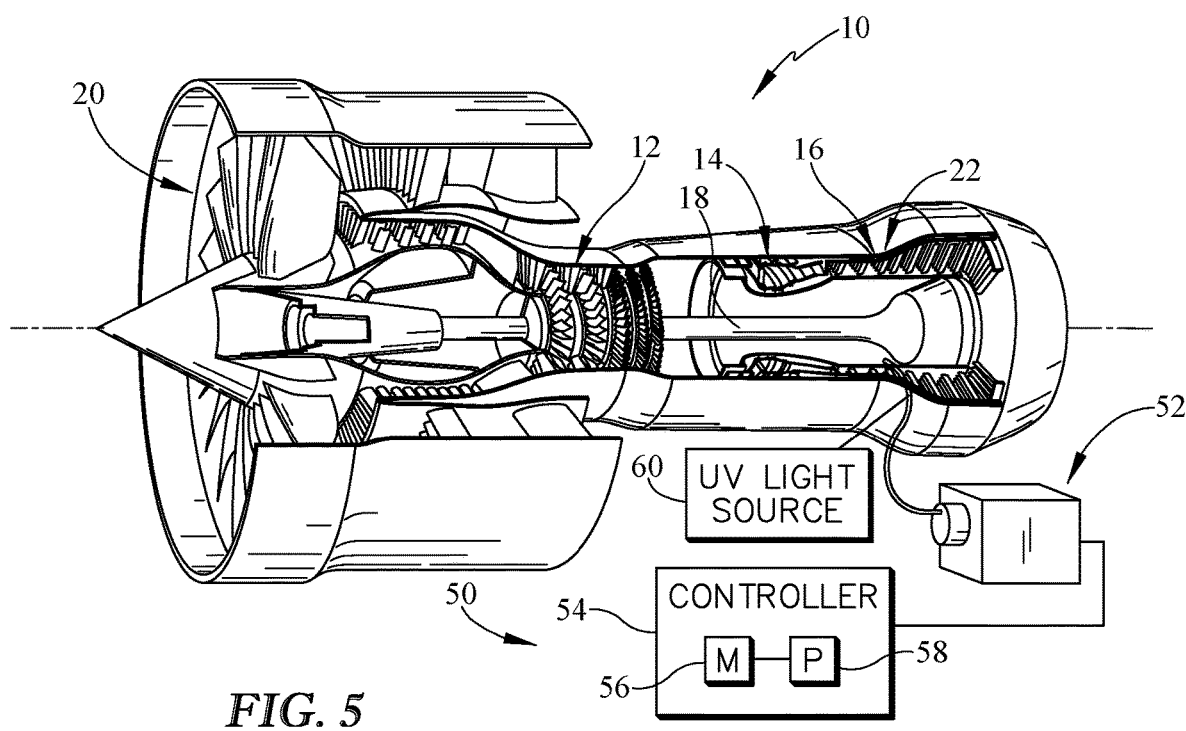
FIG. 5 is a perspective view of the gas turbine engine from FIG. 1 and a damage-identification unit with a camera and a controller configured to receive and analyze image data provided by the camera to determine if components in the gas turbine engine are in the damaged state.

A damage-identification unit 50 may be provided to omit visual inspection of the component by a human as shown in FIG. 5. The damage-identification unit 50 includes a camera 52 and a controller 54 coupled to the camera 52. The camera is illustratively embodied as a borescope and is configured to extend into the gas turbine engine 10 and to provide image data of components in the gas turbine engine 10. The controller 54 includes a microprocessor 56 and a memory storage device 58 storing instructions that, when executed, receive the image data from the camera and analyze the image data to determine if the damage-indicative coating 28 is in the intact or damage state. In one example, the controller is configured to identify cracks or flakes based on the image data to determine if the damage-indicative coating 28 is in the damaged state.

Figure 6:
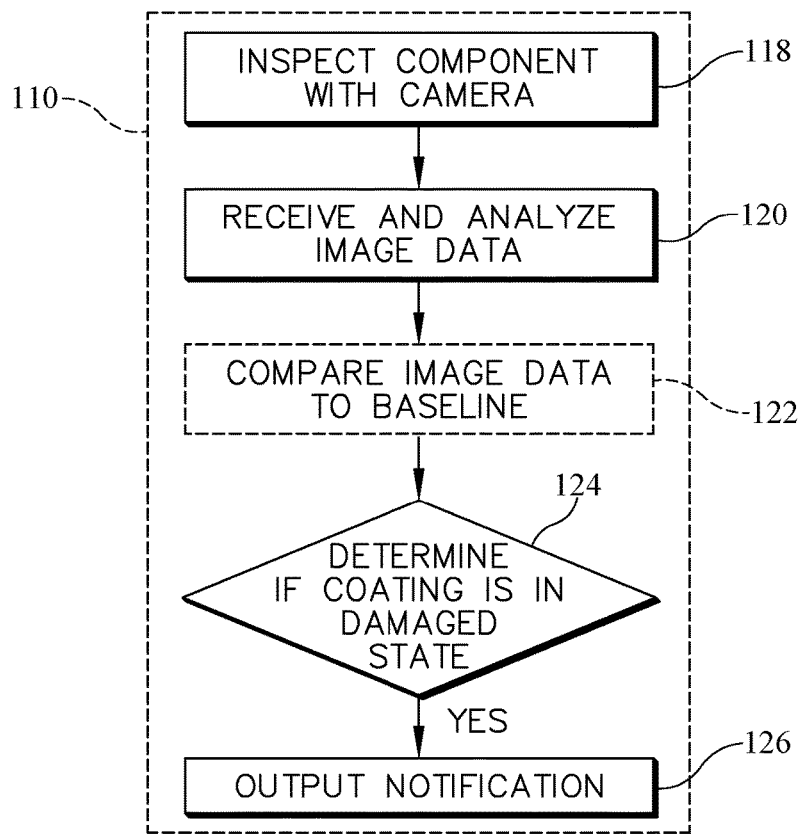
FIG. 6 is a sub-process of an inspection step from the flow chart in FIG. 4 using the damage-identification unit from FIG. 5.

In some embodiments, the step 110 of inspecting the component includes a sub-process that uses the damage-identification unit 50 to automatically determine if the damage-indicative coating 28 is in the damaged state as shown in FIG. 6. The sub-process includes a step 118 of inspecting a component with the camera 52. The camera 52 may be able to access areas of the gas turbine engine 10 not accessible to humans. The sub-process further includes a step 120 of receiving and analyzing the image data from the camera 52 with the controller 54. The controller 54 may be preprogrammed with baseline image data and the controller 54 may compare the image data received from the camera with the baseline image data at a step 122. The controller is configured to determine if the damage-indicative coating material 28 is in the damaged state at step 124. If the controller 54 determines that the damage-indicative coating 28 is in the damaged state, the controller 54 may then output a notification to a user to indicate that the component is damaged and appropriate action is needed at step 126.

In embodiments where the damage-indicative coating material includes a luminescent additive, the step 110 of inspecting the component may further include scanning the component with an UV light source 60 as shown in FIG. 5. The UV light source may be coupled to the camera 52 or separate from the camera 52. Cracks 34 or fractures in the damage-indicative coating 28 may be illuminated by the UV light source 60 due to different wavelengths of UV light being reflected off of the cracks 34 as compared to intact areas of the damage-indicative coating 28 where no cracks or fractures are present. In another embodiment, the entire damage indicative coating 28 may be strained without any cracks or fractures forming. The image data provided by the camera 52 contains the wavelengths and the controller 54 receives and analyze the wavelengths at step 120.

The wavelength of UV light reflected off the damage-indicative coating may be measured and compared by the controller 54 to a predetermined control-wavelength to determine if the component body is damaged. In one example, if the difference between the measured wavelength and the predetermined control-wavelength is greater than or equal to a threshold wavelength, then the component body has experienced a strain level greater than the predetermined strain level of the component body. In such an embodiment, a measured wavelength that is greater than or equal to the threshold wavelength may be referred to as the damaged state of the damage-indicative coating.

If it is determined that the component has the second visual appearance (i.e. is damaged), method continues with a step 112 of removing and replacing the component with a new component. The component may be replaced with another component that also has a damage-indicative coating 28 and the method 100 may be repeated as suggested in FIG. 4. If it is determined that the component has the first visual appearance (i.e. is undamaged), the component has passed initial inspection at a step 114. The component may be re-inspected as desired.

The method may further continue with a step 116 of removing the damage-indicative coating from the component body. If the damage-indicative coating 28 is provided by a wax or another suitable organic coating material, the step 116 of removing the damage-indicative coating material may include starting the gas turbine engine to remove the damage-indicative coating in a burn-off cycle. The burn-off cycle may be the initial start-up of the gas turbine engine 10 or a targeted burn-off cycle specifically designed to remove the damage-indicative coating 28. The targeted burn-off cycle may include a predetermined period of time and a predetermined temperature sufficient to remove the damage-indicative coating 28 from the component body. If the damage-indicative coating 28 includes another type of material such as a lacquer, the step 116 of removing the damage-indicative coating 28 may include purging the gas turbine engine 10 with a solvent. The type of solvent used may vary depending on the material used for the damage-indicative coating 28.

Some components in the gas turbine engine 10 may include features that could be harmed by the damage-indicative coating 28. One example of such a component is the vane 200 shown in FIG. 7. The vane 200 includes an outer endwall 202, an inner endwall 204 and an airfoil 206 that extends between the outer endwall 202 and the inner endwall 204. The airfoil 206 is formed to include an internal cooling cavity 208 that receives a cooling fluid to control a temperature of the airfoil 206 during operation of the gas turbine engine 10.

The airfoil 206 in the illustrative embodiment is also formed to include a plurality of cooling passages 210 through a trailing edge 212 of the airfoil 206. The cooling passages 210 conduct the cooling fluid from the internal cooling cavity 208 out of the airfoil 206 to enhance cooling of the trailing edge 212. Applying the damage-indicative coating to the cooling passages 210 could obstruct the cooling passages 210. Accordingly, in some embodiments, the step 106 of applying the damage-indicative coating material includes selectively applying the damage-indicative coating material.

The cooling passages 210 may be masked-off so that no damage-indicative coating material is applied to the airfoil 206 along the training edge 212. In some embodiments, the cooling passages 210 may be plugged prior to applying the damage-indicative coating material and the plugs may be removed after the step of applying is complete.

The step of selectively applying the damage-indicative coating material may further include controlling application of the damage-indicative coating material so as not interfere with the performance of the components. For example, areas of the component that interact with other components once installed may be masked-off so that no damage-indicative coating material is applied in those areas.

In some embodiments, the damage-indicative coating material is selectively applied only to gas path facing surfaces that are visible to a person inspecting the gas turbine engine 10. For example, the damage-indicative coating material may only be applied to a radially inner surface 27 of the blade track 26 as shown in FIG. 3. In other embodiments, the damage-indicative coating material may be selectively applied to non-gas path facing surfaces and inspected using a suitable borescope.

The damage-indicative coating material may only be applied to an outer surface 214 of the airfoil 206 or a gas-path facing surface 216 of one or both of the endwalls 202, 204 as shown in FIG. 7. The damage indicative coating material may be applied over an entire surface of a component only to a designated indication area, such as area 218 shown in FIG. 7.

Another illustrative example of a component with the damage-indicative coating 28 is shown in FIG. 8. The damage-indicative coating material may be applied to a strain-test coupon 300 to provide more accurate test results. Additionally, the damage-indicative coating material could be used to indicate unacceptable fatigue, creep, or vibrations imparted on the component body. The damage-indicative coating material may also be applied after testing or handling the strain-test coupon to ensure that additional damage has not occurred post-testing.

The damage-indicative coating 28 is changes from the intact state to the damage state if the strain-test coupon 300 is exposed to a strain level sufficient to damage the strain-test coupon 300. An operator about to perform a test with the strain-test coupon 300 will notice the damaged state of the damage-indicative coupon and the strain-test coupon 300 may be discarded or otherwise addressed. If the damaged strain-test coupon 300 were used in the test, in accurate test results may be obtained from the test. Accordingly, the damage-indicative coating 28 reduces a probability of operators obtaining false or inaccurate test results.

In some embodiments, during assembly into a gas turbine there may be limited opportunities to examine components beyond visual inspection. Compared to metallic components, CMC parts are easily damaged and may inadvertently or otherwise become damaged but without visual indication. Illustrative embodiment adds a removable coating 28 to the parts that may develop a visual allusion if the underlying part has been contacted with excessive force.

In some embodiments, a concern with ceramic matrix composite (CMC) components is that they may be inadvertently overstressed during assembly into an engine module 10. This may be caused by lack of compliance to process, inadequate training or use of unapproved tooling that results in too much force being used when installing a CMC component. Conventional metallic components may be less susceptible to damage due to their toughness/ductility compared with CMCs. In the illustrative embodiment, the coating 28 may be applied to the CMC component and may visibly crack or flake off when placed under a strain caused by an unacceptable stress in the underlying CMC component body.

In some embodiments, the coating may be a wax, lacquer or similar material which cracks at a low strain. The cracking strain of the coating may be close to, but less than, the strain at which damage to the CMC component body occurs, typically about 0.05%. The coating 28 may be organic in nature and may evaporate or burn away during initial engine start-up. Alternatively, the coating 28 may be based on a high temperature material such as silicon carbide or yttrium oxide that is not detrimental to the operation of the component. The coating 28 could be globally applied or just locally to defined handling/interface locations. An amount of coating may be carefully controlled to provide an appropriate coating thickness and/or change in thickness so that a sufficient burn-out removes the coating to ensure that the coating does not affect component fit or functionality.

In some embodiments, following module assembly, the inspector may assess the exposed parts of the CMC components and look for visible evidence of damage highlighted by cracks or missing flakes of the coating 28. An additive may be made to the coating to make it fluorescent under UV light, and may make detection easier. If damage is detected then the parts may be subject to thorough in-situ inspection and/or removed from the engine to be appropriately sentenced. This could reduce the likelihood of expensive infantile part failures.

In some embodiments, a visual indication of damage to CMC parts can be applied to any fragile component (e.g. ceramic based Thermal Barrier Coatings on metallic turbine components). Furthermore, an alternative removal approach (i.e. one that does not require elevated temperatures) may be used so that coating 28 may be suitable for parts outside of the high temperature turbine environment (e.g. on Organic Matrix Composite fan blades). For example, an alternative removal approach could be through reaction with a chemical that could be applied prior to running the engine for the first time, for example by purging the main gas path and secondary air system. In one example, the engine may be purged with water vapour for water soluble coating materials or organic solvent vapours in the case of coatings that are organically soluble. Furthermore, if the coating is not detrimental to the operation of the component and the coating material is not subject to spallation which could pose a hazard to the application, the coating could be left in-tact during operation.

In addition to engine parts, the coating could be applied to CMC test coupons, rig parts and other non-production hardware to assess damage prior to test and avoid tainting test data with potential special cause failures. Additionally, the coating could be applied after test to illustrate further damage outside of a controlled test environment.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of detecting damage to a ceramic matrix composite component prior to use in a gas turbine engine, the method comprising
   providing a component body comprising ceramic matrix composite materials,
   selecting a damage-indicative coating material configured to change from (i) an intact state in which the damage-indicative coating material has a first appearance to (ii) a damaged state in which the damage-indicative coating material has a second appearance in response to the component body experiencing a strain level greater than a predetermined strain level of the component body,
   applying the damage-indicative coating material to establish an outermost coating layer on the component body to provide a damage-indicative coating once the coating material is solidified,
   installing the component with the applied damage-indicative coating in the gas turbine engine,
   inspecting the damage-indicative coating in the gas turbine engine to determine if the damage-indicative coating has the first appearance or the second appearance, and
   replacing the component with a new component upon determining that the damage-indicative coating has the second appearance.

2. The method of claim 1, further comprising a step of starting the gas turbine engine to remove the damage-indicative coating in a burn-off cycle upon determining that the damage-indicative coating has the first appearance after the step of inspecting the component.

3. The method of claim 2, wherein the damage-indicative coating comprises a wax.

4. The method of claim 1, further comprising a step of purging the gas turbine engine with a solvent to remove the damage-indicative coating after the step of inspecting the component.

5. The method of claim 4, wherein the damage-indicative coating comprises a lacquer.

6. The method of claim 1, wherein the predetermined strain level is less than or equal to a proportional limit strength of the component body.

7. The method of claim 6, wherein the predetermined strain level is less than the proportional limit strength of the component body.

8. The method of claim 7, wherein the predetermined strain level is about 0.05 percent.

9. The method of claim 6, wherein the step of selecting the damage-indicative coating material includes selecting a damage-indicative coating material that has a fracture strength that is equal to the proportional limit strength of the component body.

10. The method of claim 1, wherein the step of applying the damage-indicative coating material includes selectively applying the coating material only to areas that are visible during the step of inspecting the component.

11. The method of claim 10, wherein the damage-indicative coating material is selectively applied to gas path facing surfaces.

12. The method of claim 10, wherein the step of selectively applying the damage-indicative coating material includes masking off areas of the component that interact with other components after the component is installed.

13. The method of claim 10, wherein the step of selectively applying the damage-indicative coating material includes masking off cooling holes formed in the component body.

14. The method of claim 1, wherein the second appearance is provided by at least one of cracks in the damage-indicative coating and portions of the damage-indicative coating flaking off of the component.

15. The method of claim 1, wherein the damage-indicative coating comprises a luminescent additive and the step of inspecting the component includes scanning the component with ultraviolet light.

16. A component for use in a gas turbine engine, the component comprising
a component body configured to be mounted in the gas turbine engine, and
a damage-indicative coating establishing an outermost surface of the component that is visible during inspection of the component, the damage-indicative coating having a fracture strength that is equal to a predetermined strain level of the component body,
wherein the damage-indicative coating is configured to change from an intact state in which the damage-indicative coating has a first visual appearance to a damaged state in which the damage-indicative coating has a second visual appearance in response to the component experiencing a strain level greater than the predetermined strain level of the body,
wherein the component body comprises ceramic matrix composite materials, and
wherein the damage-indicative coating comprises a wax and is configured to be removed from the component body during initial start-up of the gas turbine engine.

17. A component for use in a gas turbine engine, the component comprising
a component body configured to be mounted in the gas turbine engine, and
a damage-indicative coating establishing an outermost surface of the component that is visible during inspection of the component, the damage-indicative coating having a fracture strength that is equal to a predetermined strain level of the component body,
wherein the damage-indicative coating is configured to change from an intact state in which the damage-indicative coating has a first visual appearance to a damaged state in which the damage-indicative coating has a second visual appearance in response to the component experiencing a strain level greater than the predetermined strain level of the body,
wherein the component body comprises ceramic matrix composite materials, and
wherein the damage-indicative coating comprises a lacquer and is configured to be removed from the component body by purging the gas turbine engine with a solvent.

* * * * *